United States Patent [19]

Nakano et al.

[11] Patent Number: 5,055,543
[45] Date of Patent: Oct. 8, 1991

[54] HIGH SPEED MOISTURE CURE POLYURETHANE SEALANT

[75] Inventors: Yoshinori Nakano, Osaka; Kyohisa Kotsuma, Sinmachi; Masayoshi Ito, Higashi, all of Japan

[73] Assignee: Sunrise Meisei Corporation, Osaka, Japan

[21] Appl. No.: 355,627

[22] Filed: May 23, 1989

[30] Foreign Application Priority Data

Nov. 25, 1988 [JP] Japan .................................. 63-298885

[51] Int. Cl.$^5$ .............................................. C08G 18/24
[52] U.S. Cl. ...................................... 528/58; 502/156; 502/352
[58] Field of Search ................... 528/58; 502/156, 352

[56] References Cited

U.S. PATENT DOCUMENTS

| | | |
|---|---|---|
| 3,055,845 | 9/1962 | Merten et al. |
| 3,194,770 | 7/1965 | Hostettler .......................... 502/156 |
| 3,635,906 | 1/1972 | Jayawant ........................... 502/156 |
| 3,828,007 | 8/1974 | Throckmorton et al. ............. 528/45 |
| 3,945,981 | 3/1976 | Robertson ........................... 528/58 |
| 4,038,304 | 7/1977 | Kazama et al. ...................... 528/58 |
| 4,043,949 | 8/1977 | Treadwell et al. ................... 521/126 |
| 4,087,412 | 5/1978 | Groves .............................. 528/58 |
| 4,102,716 | 7/1978 | Groves et al. ...................... 524/871 |
| 4,239,857 | 12/1980 | Harper .............................. 528/58 |

FOREIGN PATENT DOCUMENTS 0264675 9/1987 European Pat. Off. .

OTHER PUBLICATIONS

Chemical Abstracts, vol. 86, No. 16, Apr. 16, 1977, p. 15, Abstract 107242h, Columbus, Ohio, U.S.

Primary Examiner—John Kight, III
Assistant Examiner—Rabon Sergent
Attorney, Agent, or Firm—Edwin E. Greigg; Ronald E. Greigg

[57] ABSTRACT

Disclosed herein is a one part moisture cure sealant which is cured under an ordinary temperature by reaction with moisture contained in the air. This sealant contains a cure accelerating catalyst of:

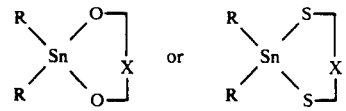

in a sealing composite containing urethane prepolymer. Due to the action of this catalyst, not only the cure rate is improved but difference in the cure rate between a low-temperature/low-humidity season and a high-temperature/high-humidity season is reduced. This sealant is also excellent in storage stability.

24 Claims, No Drawings

HIGH SPEED MOISTURE CURE POLYURETHANE SEALANT

BACKGROUND OF THE INVENTION

1. Field of the Invention

The present invention relates to a one part moisture cure polyurethane sealant which is cured under an ordinary temperature by reaction with moisture contained in the air, and more particularly, it relates to a sealant containing urethane prepolymer.

2. Description of the Prior Art

A one part moisture cure polyurethane sealant is a useful sealant which is cured under an ordinary temperature by reaction of an isocyanate group contained in urethane prepolymer and moisture contained in the air. The cure rate and storage stability of such a sealant depend on the type and function of a cure accelerating catalyst (hereinafter simply referred to as "catalyst").

In general, catalysts accelerating curing of urethane prepolymer are classified into:

(1) naphthenate or octenate salts of heavy metals such as tin, lead, bismuth, cobalt and manganese;

(2) heavy metal organic compounds such as dibutyl tin malate and dibutyl tin dilaurate; and (3) tertiary amine and other nitrogen-containing materials such as N-alkyl morpholine, N-alkyl aliphatic polyamine, N-alkyl piperazine and triethylenediamine.

A one part sealant in a closed container must have storage stability which is ensured at least six months under an ordinary temperature, in addition to quick curability. The tertiary amine and other nitrogen-containing compounds classified in the above item (3) are considerably problematic in storage stability as compared with the compounds classified in the items (1) and (2), and inferior in curability under low-temperature/low-humidity conditions (lower than 10° C. and 50% R.H.).

For example, U.S. Pat. Nos. 4,574,793 and 4,758,648, the disclosures of which are incorporated herein by reference, employ such tertiary amine and other nitrogen-containing compounds.

In consideration of curability, workability, storage stability and sealant properties after curing of such a one part polyurethane sealant, dibutyl tin malate, dibutyl tin dilaurate and the like classified in the above item (2) are empirically employed as catalysts for commercially available one part polyurethane sealants of high performance, in the present circumstances.

U.S. Pat. No. 3,391,101, the disclosure of which is incorporated herein by reference, relating to a two part polyurethane sealant obtained by mixing urethane prepolymer and polyether polyol immediately before employment is basically different from the inventive one part polyurethane sealant, and lists a large number of chemical names relating to catalysts.

U.S. Pat. No. 4,758,648, the disclosure of which is incorporated herein by reference, describes well-known catalysts etc. for a one part polyurethane sealant, but the same mentions no catalyst synthesized according to the present invention.

When a catalyst belonging to the above item (2) is employed, the cure rate is extremely reduced under low-temperature/low-humidity conditions and extremely increased under high-temperature/high-humidity conditions. That is, too much difference is caused in the cure rate between winter and summer seasons, to hinder work control.

Although a catalyst for a one part moisture cure polyurethane sealant has an extremely important function of accelerating curing, presence of such a catalyst is rendered unpreferable once a sealing composite is cured. That is, when the cured sealing composite is exposed to extremely severe aging conditions such as high-temperature/high-humidity conditions or too strong ultraviolet rays, the catalyst once serving as a cure accelerator breaks a polyurethane linkage or a urea linkage as a harmful matter accelerating depolymerization this time. While functions of catalysts are extremely complex in general and theoretical clarification thereof is difficult, it is readily imaginable that, if a cured sealing composite is exposed to extremely severe aging conditions, the catalyst contained in the composite itself may be thermally dissociated or hydrolyzed.

Considering the result of thermal dissociation or hydrolysis caused in the catalyst contained in the cured sealing composite under extremely severe conditions, an acid substance such as a COOH radical is formed as the result of thermal dissociation or hydrolysis since every counterpart for a heavy metal is an organic acid having a COOH radical as chemical structure common to the compounds belonging to the above items (1) and (2), to exert bad influence on an adhered surface which is brought into contact with the sealant. It can be readily inferred that, when a polyurethane sealant is applied to a steel plate for an automobile, the presence of such a COOH radical caused by thermal dissociation or hydrolysis of the catalyst contained in the cured sealing composite itself exerts bad influence on rusting and embrittlement of the steel plate.

In order to develop an excellent one part sealant having good properties such as quick curability, storage stability and the like, therefore, it is necessary to synthesize a novel catalyst and blend the same with a sealing composite.

SUMMARY OF THE INVENTION

An object of the present invention is to provide a one part moisture cured polyurethane sealant having excellent storage stability, which can attain quick curability and reduce difference between cure rates under low-temperature/low-humidity conditions and high-temperature/high-humidity conditions, by synthesizing a novel catalyst and blending the same with a sealing composite.

The inventive one part moisture cure polyurethane sealant is obtained by adding/blending:

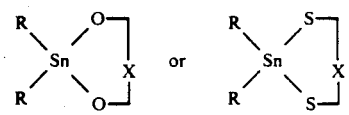

to/with a sealing composite containing urethane prepolymer as a cure accelerating catalyst. Symbol R indicates a univalent hydrocarbon radical, and symbol X indicates an OH residual radical of dihydric alcohol or an SH residual radical of dihydric thioalcohol.

DETAILED DESCRIPTION OF THE INVENTION

A sealing composite employed in the present invention contains 0.01 to 1.0 percent by weight, preferably 0.02 to 0.2 percent by weight of a catalyst of:

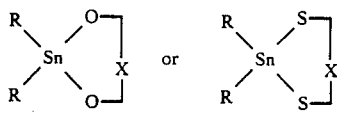

with respect to the sealant.

Urethane prepolymer employed in the present invention is obtained by the well-known technique as a reaction product of polyether polyol and organic polyisocyanate. Polyether polyol is prepared from diol, triol or a mixture of diol and triol of 1,000 to 10,000 in molecular weight, and the ratio of combination is 10:90 to 90:10.

The main chain of this polyether polyol is alkylene oxide, e.g., propylene oxide, or alkylene oxide mainly composed of propylene oxide and partially containing 5 to 20% by weight of ethylene oxide. Effectiveness of prepolymer partially containing ethylene oxide is described in U.S. Pat. No. 3,391,101 in particular.

Examples of organic polyisocyanate are general organic industrial products such as 2,4 and 2,6-diisocyanate toluene, diphenylmethane-4,4'-diisocyanate, hexamethylene 1,6-diisocyanate, 1,3-bis(isocyanate methyl)-cyclohexane and the like.

In addition to the urethane prepolymer, a plasticizer, carbon black, a slump inhibitor, a storage stabilizer, an oxidation inhibitor, an ultraviolet absorbent and the like are blended with the sealing composite as needed.

The hydrocarbon radical R contained in the catalyst can be selected from various substances. For example, the hydrocarbon radical R may be an alkyl radical whose carbon number is preferably not more than 20 such as an n-butyl radical, an n-octyl radical or a stearyl radical, but is not restricted to this.

The OH or SH residual radical X contained in the catalyst can be selected from various organic groups.

Examples of dihydric alcohol for synthesizing:

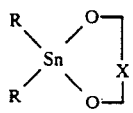

are ethylene glycol, tetramethyl ethylene glycol, 1,5-pentanediol, 2,4-pentanediol, cis 2-buten 1,4-diol, β-monolaurin and the like.

Examples of dihydric thioalcohol for synthesizing:

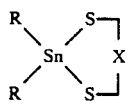

are ethylene dithioglycol, 1,4-butanedithiol, 1,2-diphenyl ethylene dithioglycol and the like.

The catalyst according to the present invention is not restricted to that synthesized by a specific synthesizing method, but can be synthesized by reaction between dialkyl tin oxide and alcohol or thioalcohol. In order to add alcohol or thioalcohol to 1 mol of dialkyl tin oxide $R_2SnO$, which is tetravalent tin, the following two methods may be considered:

(A) a method of adding 2 mols of alcohol having one OH radical or 2 mols of thioalcohol having one SH radical; and (B) a method of adding 1 mol of alcohol having two OH radicals or 1 mol of thioalcohol having two SH radicals.

The chemical structural material of the catalyst finally regarded as the object of the present invention by the inventors is a compound which is manufactured not by the method (A) but by the method (B).

A one part moisture cure polyurethane sealant is cured by reaction with moisture contained in the air, while urethane prepolymer of about 30% is still included at the end point of reaction in general. If there is a segment which re-constructs this urethane prepolymer of about 30% or a component resulting from depolymerization of the cured sealing composite exposed to extremely severe aging conditions, the same can advantageously serve as a countermeasure for attaining aging resistance. In order to apply the result of thermal dissociation or hydrolysis of the catalyst contained in the cured sealing composite itself to reconstruction of urethane prepolymer, the catalyst according to the present invention must be synthesized through the reaction in the above item (B), for example, but not in the item (A). In more concrete terms, alcohol having one OH radical or thioalcohol having one SH radical generated as the result of thermal dissociation or hydrolysis of the catalyst synthesized through the reaction of (A) merely masks urethane prepolymer and has no polymerizing ability, while alcohol having two OH radicals or thioalcohol having two SH radicals generated as the result of thermal dissociation or hydrolysis of the catalyst synthesized through the reaction of (B) has a chain extending function and is able to polymerize urethane prepolymer.

The compound resulting from thermal dissociation or hydrolysis of the catalyst contained in the cured sealing composite itself under extremely severe conditions is approximate to a neutral substance having an OH or SH radical according to the present invention, whereby no bad influence is exerted on an adhered surface which is brought into contact with the sealant.

The inventive one part moisture cure polyurethane sealant is expected as a one part high speed cure sealant which is optimum for a direct glazing method for front and rear window glass and car bodies in an automobile production line, as well as applicable to a one part high speed cure polyurethane sealant for architecture/construction, when dehumidified carbon black is substituted for an ordinary dehumidified powder filler.

Implemented according to the present invention is a moisture cure polyurethane sealant having good long-term storage stability, which is excellent in quick curability and which can reduce the difference in the cure rate between winter and summer seasons.

In the moisture cure polyurethane sealant according to the present invention, no bad influence is exerted on an adhered surface even if the catalyst itself is thermally dissociated or hydrolyzed after curing of the sealing composite.

Examples of the present invention are now described in detail.

EXAMPLES 1 and 2

Dibutyl tin oxide $(C_4H_9)_2SnO$ was selected as dialkyl tin oxide of a heavy metal side and tetramethyl ethylene glycol $(CH_3)_2C(HO)-C(HO)(CH_3)_2$ was selected as alcohol having two OH radicals while ethylene dithioglycol $HSCH_2CH_2SH$ was selected as thioalcohol having two SH radicals, and these were reacted under the following experimental conditions to derive a chemical structural material for serving as a catalyst:

24.87 g of dibutyl tin oxide and 11.80 g of tetramethyl ethylene glycol (anhydrous) were measured in a round bottom flask, and 84.5 g of dehumidified xylene was added thereto. A water separator and a condenser were mounted on the flask and reaction was caused for three hours while making a reflux at 138° to 144° C., to obtain an objective material. The reaction formula is described below as formula (1). The reaction yield was substantially 100%, from the amount of biproduced water.

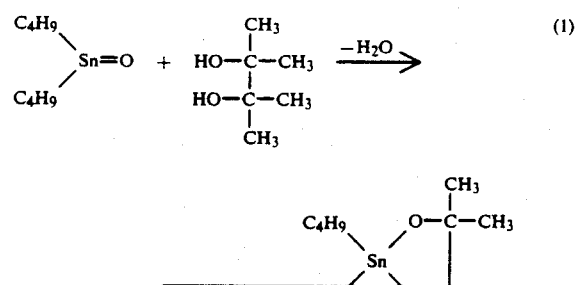

Also with 24.87 g of dibutyl tin oxide and 9.42 g of ethylene dithioglycol, reaction was caused for two hours through chemical operation absolutely identical to the above, to obtain an objective material. The reaction formula is described below as formula (2). In this case, the reaction yield was 97%, from the amount of biproduced water.

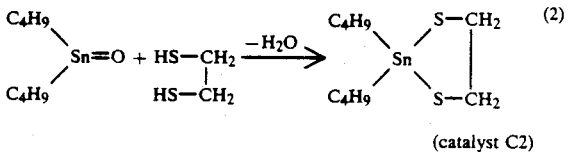

Cure properties of the novel catalysts C1 and C2 thus synthesized were compared with that of dibutyl tin malate, which is one of the most effective catalysts within a conventional catalyst group, under various temperature/humidity conditions. In order to simplify blended composites, no powder filler was added. Reference Example 1 was prepared by adding 0.01 to 1.0 percent by weight of the conventional catalyst, dibutyl tin malate to a liquid composite containing 80 percent by weight of urethane prepolymer (TAKENATE HX301-10: product by Takeda Chemical Industries, Ltd. of 6000 in average molecular weight and 1.86 in NCO %) and 20 percent by weight of a plasticizer DOP (dioctylphthalate), and Example 1 was prepared by adding 0.01 to 1.0 percent of the novel catalyst C1 according to the present invention to the same while Example 2 was prepared by adding 0.01 to 1.0 percent by weight of the catalyst C2 according to the present invention to the same, and subjected to measurement of tackfree time and cure film thickness. Table 1 shows the results.

TABLE 1

| | | Tackfree Time (min.) Cure Condition | | | Thickness after 3 hrs. (mm) Cure Condition | | |
|---|---|---|---|---|---|---|---|
| Catalyst | | 10° C. 50% RH | 20° C. 65% RH | 30° C. 95% RH | 10° C. 50% RH | 20° C. 65% RH | 30° C. 95% RH |
| Ref. | 0.01% | 210 | 56 | 12 | No Film | 0.7 | 2.0 |
| Ex. 1 | 0.02 | 150 | 46 | 10 | Below 0.1 | 0.7 | 2.1 |
| | 0.04 | 120 | 40 | 8 | 0.1 | 0.8 | 2.2 |
| | 0.20 | 75 | 26 | 5 | 0.1 | 1.0 | 2.4 |
| | 1.00 | 52 | 18 | 3 | 0.2 | 1.5 | 3.0 |
| Ex. 1 | 0.01 | 110 | 45 | 12 | 0.1 | 1.1 | 2.0 |
| (C1) | 0.02 | 90 | 38 | 10 | 0.2 | 1.1 | 2.1 |
| | 0.04 | 70 | 30 | 8 | 0.2 | 1.2 | 2.2 |
| | 0.20 | 44 | 20 | 6 | 0.3 | 1.4 | 2.4 |
| | 1.00 | 32 | 12 | 4 | 0.5 | 2.0 | 2.8 |
| Ex. 2 | 0.01 | 120 | 48 | 12 | 0.1 | 1.0 | 2.0 |
| (C2) | 0.02 | 95 | 40 | 10 | 0.2 | 1.1 | 2.0 |
| | 0.04 | 70 | 30 | 9 | 0.2 | 1.2 | 2.0 |
| | 0.20 | 49 | 22 | 6 | 0.3 | 1.3 | 2.5 |
| | 1.00 | 31 | 14 | 4 | 0.4 | 1.8 | 2.8 |

As easily understood from the results shown in Table 1, the novel catalysts C1 and C2 according to the present invention are extremely superior to the conventional catalyst under various temperature/humidity conditions, in relation to the tackfree time and cure film thickness, which are factors for quick curability. Further, it is of interest that the catalysts C1 and C2 according to the present invention are not only faster in curability than the conventional catalyst but effects thereof are extremely large under 10° C. and 50% RH conditions while being slight under 30° C. and 95% RH conditions. Thus, it is understood that difference in the cure rate between winter and summer seasons is extremely reduced in the inventive catalyst and the cure rate is flattened to contribute to work control and quality control.

In addition to Examples 1 and 2, various types of dihydric alcohol and dihydric thioalcohol were selected to chemically synthesize the following catalysts through chemical operation absolutely identical to that in the Examples 1 and 2.

EXAMPLE 3

24.87 g of dibutyl tin oxide and 10.42 g of 2,4-pentanediol were reacted for four hours through chemical operation absolutely identical to the above, to obtain an objective material. The reaction formula is described below as formula (3). The reaction yield was 97% from the amount of biproduced water.

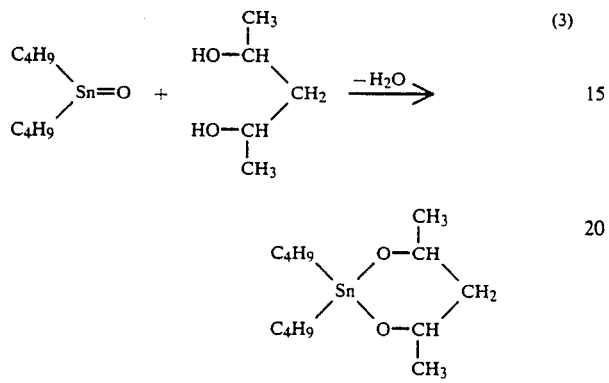

(catalyst C3)

EXAMPLE 4

24.87 g of dibutyl tin oxide and 10.42 g of 1,5-pentanediol were reacted for four hours through chemical operation absolutely identical to the above, to obtain an objective material. The reaction is formula is described belog as formula (4). The reaction yield was 97% from the amount of biproduced water.

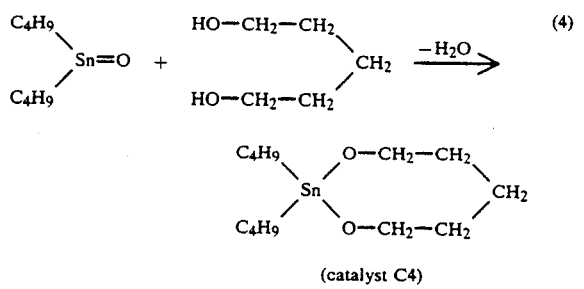

(catalyst C4)

EXAMPLE 5

24.87 g of dibutyl tin oxide and 12.23 g of 1,4-butanedithiol were reacted for five hours through chemical operation absolutely identical to the above, to obtain an objective material. The reaction formula is described below as formula (5). In this case, the reaction yield was 96% from the amount of biproduced water.

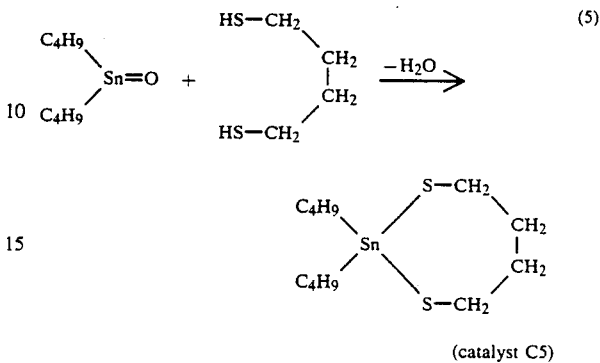

(catalyst C5)

0.04 percent by weight of the catalysts synthesized in the Examples 3, 4 and 5 were added to the aforementioned liquid composites, to measure values of the tackfree time and cure film thickness. Table 2 shows the results.

TABLE 2

| Catalyst | Tackfree Time (min.) Cure Condition | | | Thickness after 3 hrs. (mm) Cure Condition | | |
|---|---|---|---|---|---|---|
| | 10° C. 50% RH | 20° C. 65% RH | 30° C. 95% RH | 10° C. 50% RH | 20° C. 65% RH | 30° C. 95% RH |
| C3  0.04% | 85 | 35 | 10 | 0.2 | 1.1 | 2.0 |
| C4  " | 80 | 32 | 9 | 0.2 | 1.2 | 2.2 |
| C5  " | 85 | 34 | 10 | 0.2 | 1.1 | 2.0 |

EXAMPLES 6 and 7

On the basis of the results of Examples 1 and 2 and consideration and recognition heretofore made, the one part polyurethane sealants quickly curable under ordinary temperatures were exemplarily produced. Reference Example 2 was prepared by blending 0.04 percent by weight of a catalyst prepared from dibutyl tin malate to a composite containing 48 percent by weight of urethane prepolymer (TAKENATE HX301-10: product by Takeda Chemical Industries, Ltd. of 6000 in average molecular weight and 1.86 in NCO %), 12 percent by weight of a dehydrated plasticizer, 36 percent by weight of dehumidified carbon black, not more than 2 percent by weight of a solvent, not more than 2 percent by weight of a slump inhibitor, not more than 1 percent by weight of a storage stabilizer, not more than 0.5 percent by weight of an oxidation inhibitor and not more than 0.5 percent by weight of an ultraviolet absorbent, and Example 6 was prepared by blending 0.04 percent by weight of the aforementioned catalyst C1 to the said composite while Example 7 was prepared by blending 0.04 percent of the aforementioned catalyst C2 to the said composite. These samples were produced while blocking moisture under vacuum or nitrogen atmospheres, and packed and stored. Table 3 shows properties thereof.

TABLE 3

| Performance | Composite | | |
|---|---|---|---|
| | Ref. Example 2 | Example 6(C1) | Example 7(C2) |
| Quick Curability | | | |
| Tackfree Time | | | |
| 10° C. 50% R.H. | 130 min. | 80 min. | 80 min. |

TABLE 3-continued

| Performance | Composite Ref. Example 2 | Example 6(C1) | Example 7(C2) |
|---|---|---|---|
| 20° C. 65% R.H. | 50 | 35 | 35 |
| 30° C. 95% R.H. | 9 | 9 | 9 |
| Cure Rate (Shear Strength) | | | |
| 10° C. 50% R.H. | 0.3 Kgf/cm² | 1.4 Kgf/cm² | 1.4 Kgf/cm² |
| 20° C. 65% R.H. | 2.6 | 8.6 | 7.1 |
| 30° C. 95% R.H. | 12.0 | 15.4 | 14.0 |
| Workability | | | |
| Initial Discharge (g/min.) | 750 | 750 | 750 |
| Initial Viscosity (cps) | 310 × 10⁴ | 310 × 10⁴ | 310 × 10⁴ |
| Discharge after 50° C. × 120 h. (g/min.) | 480 | 480 | 460 |
| Viscosity after 50° C. × 120 h. (cps) | 320 × 10⁴ | 320 × 10⁴ | 320 × 10⁴ |
| Long-Term Storage Stability 20° C. 65% RH Over 6 Months | Good | Good | Rather Good |
| Adherend Staining (After Warm Water Test) | Yes | No | No Discolored |
| Flexibility of Baking-Finished Steel Plate Film Aging Resistance (After Curing) | | | |
| Initial Strength | 62 Kgf/cm² | 68 Kgf/cm² | 64 Kgf/cm² |
| After 100° C. × 500 h. | 45 | 51 | 50 |
| After 40° C. Warm Water × 7 Days | 60 | 67 | 63 |

As understood from the results shown in Table 3, each inventive polyurethane sealant, which is quickly curable under an ordinary temperature, is particularly excellent in quick curability and storage stability, as well as workability, adherend staining and aging resistance after curing.

Although 0.01 to 1.0 percent by weight of the catalyst is added to the sealant in each of the aforementioned Examples, the catalyst may be added in excess of 1.0 percent by weight, to further effectively attain quick curability. However, storage stability, which is another most important property of the sealant, is deteriorated as the content of the catalyst is increased. Such storage stability is within a practical range even if the catalyst content exceeds 1.0 percent by weight, in an uniform substance of sealants defined by the terms of the appended claims.

What is claimed is:

1. In a one part polyurethane sealant containing a cure accelerating catalyst, said accelerating catalyst comprising:

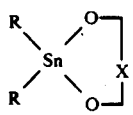

where R represents a univalent hydrocarbon radical and X represents an OH residual radical of dihydric alcohol.

2. The one part polyurethane sealant in accordance with claim 1, wherein the carbon number of X is not more than 20.

3. The one part polyurethane sealant in accordance with claim 2, wherein X represents an OH residual radical of tetramethyl ethylene glycol.

4. The one part polyurethane sealant in accordance with claim 1, where R represents an alkyl radical having a carbon number of not more than 20.

5. The one part polyurethane sealant in accordance with claim 4, wherein R represents a butyl radical.

6. The one part polyurethane sealant in accordance with claim 1, wherein

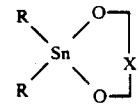

is synthesized by reaction of dihydric alcohol containing X and an organic tin compound.

7. The one part polyurethane sealant in accordance with claim 6, wherein said organic tin compound employed in said synthesizing reaction is dibutyl tin oxide.

8. The one part polyurethane sealant in accordance with claim 1, wherein a polyurethane prepolymer is employed therein which is obtained by reaction of polyether polyol and organic polyisocyanate, said polyether polyol being diol, triol or a mixture of diol and triol, the main chain of said polyether polyol being propylene oxide or alkylene oxide mainly composed of propylene oxide and partially containing ethylene oxide.

9. The one part polyurethane sealant in accordance with claim 1, wherein 0.01 to 1.0 percent by weight of said catalyst is contained in said sealant.

10. The one part polyurethane sealant in accordance with claim 1, wherein a filler, a plasticizer, or a mixture thereof is added to blend with said sealant.

11. The one part polyurethane sealant in accordance with claim 1, wherein benzoil chloride or p-toluene sulfonic acid is added to blend with said sealant as a storage stabilizer.

12. In a one part polyurethane sealant containing a cure accelerating catalyst, said accelerating catalyst comprising:

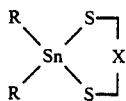

where R represents a univalent hydrocarbon radical and X represents an SH residual radical of dihydric thioalcohol.

13. The one part polyurethane sealant in accordance with claim 12, wherein the carbon number of X is not more than 20.

14. The one part polyurethane sealant in accordance with claim 13, wherein X represents an SH residual radical of ethylene dithioglycol.

15. The one part polyurethane sealant in accordance with claim 12, wherein R represents an alkyl radical having a carbon number of not more than 20.

16. The one part polyurethane sealant in accordance with claim 15, wherein R represents a butyl radical.

17. The one part polyurethane sealant in accordance with claim 12, wherein

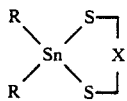

is synthesized by reaction of dihydric thioalcohol containing X and an organic tin compound.

18. The one part polyurethane sealant in accordance with claim 17, wherein said organic tin compound employed in said synthesizing reaction is dibutyl tin oxide.

19. The one part polyurethane sealant in accordance with claim 12, wherein a polyurethane prepolymer is employed for said one part polyurethane sealant which is obtained by reaction of polyether polyol and organic polyisocyanate, said polyether polyol being diol, triol or a mixture of diol and triol, the main chain of said polyether polyol being propylene oxide or alkylene oxide mainly composed of propylene oxide and partially containing ethylene oxide.

20. The one part polyurethane sealant in accordance with claim 12, wherein 0.01 to 1.0 percent by weight of said catalyst is contained in said sealant.

21. The one part polyurethane sealant in accordance with claim 12, wherein a filler, a plasticizer, or a mixture thereof is added to blend with said sealant.

22. The one part polyurethane sealant in accordance with claim 12, wherein benzoil chloride or p-toluene sulfonic acid is added to blend with said sealant as a storage stabilizer.

23. In the method for preparing a one part polyurethane sealant containing a cure accelerating catalyst, the improvement comprising:

(a) mixing 0.01 to 1.0 percent by weight of said catalyst comprising:

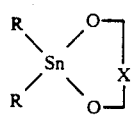

where R represents a univalent hydrocarbon radical and X represents an OH residual radical of dihydric alcohol, with (b) 80% by weight urethane prepolymer and 20% by weight plasticizer.

24. In the method for preparing a one part polyurethane sealant containing a cure accelerating catalyst, the improvement comprising:

(a) mixing 0.01 to 1.0 percent by weight of said catalyst comprising:

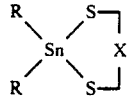

where R represents a univalent hydrocarbon radical and X represents an SH residual radical of dihydric thioalcohol, with (b) 80% by weight urethane prepolymer and 20% by weight plasticizer.

* * * * *

UNITED STATES PATENT AND TRADEMARK OFFICE
CERTIFICATE OF CORRECTION

PATENT NO. : 5,055,543

DATED : Oct. 8, 1991

INVENTOR(S) : Yoshinori Nakano, et al.

It is certified that error appears in the above-identified patent and that said Letters Patent is hereby corrected as shown below:

On the title page, [75] Inventors should read as follows:

--Yoshinori Nakano, Osaka; Kyohisa Kotsuma, Osaka; Masayoshi Ito, Osaka, all of Japan--.

In columns 5 and 6, the Reaction Formula in column 5 is overlapping Table 1 in center of page.

In columns 7 and 8, the Reaction Formula in column 7 is overlapping Table 2 in center of page.

Signed and Sealed this

Twentieth Day of October, 1992

Attest:

DOUGLAS B. COMER

*Attesting Officer*   *Acting Commissioner of Patents and Trademarks*